UNITED STATES PATENT OFFICE.

PETER M. WILSON, OF RALEIGH, NORTH CAROLINA, ASSIGNOR OF THREE-FOURTHS TO COLIN M. HAWKINS AND REED & McGEE, ALL OF SAME PLACE.

ART OF MANUFACTURING TOBACCO.

SPECIFICATION forming part of Letters Patent No. 421,373, dated February 11, 1890.

Application filed February 27, 1889. Serial No. 301,346. (No specimens.)

*To all whom it may concern:*

Be it known that I, PETER M. WILSON, a citizen of the United States, residing at Raleigh, in the county of Wake and State of North Carolina, have invented certain new and useful Improvements in the Art of Manufacturing Tobacco; and I hereby declare the following to be a full, clear, and exact description of the invention, such as will enable others skilled in the art to which it appertains to make and use the same.

This invention relates to the manufacture of tobacco.

The object is to utilize in the manufacture of tobacco what has heretofore been a waste product, and at the same time to utilize it in a manner beneficial to the manufacturer and to the consumer by largely preventing deleterious adulterations.

With these objects in view the invention consists in the method of utilizing tobacco-stems in the manufacture of tobacco, particularly of packed or plug tobacco, which consists in reducing the stems to a powder, preferably to an exceedingly fine or nearly impalpable powder or dust, and incorporating the stems in this finely-divided condition with the leaf by placing the pulverized stem substance and the leaf substance together, layer after layer of each, and compacting by pressure until a solid product or plug is made, which is sufficiently rigid to hold together and keep its form, all as hereinafter set forth.

Heretofore it has been attempted to utilize the stems in the manufacture of tobacco in various ways, the state of the art being about as follows: It has been sought to utilize the stems by shredding, splitting, or cutting them and mixing them coarsely and loosely with leaf in the manufacture of cigars and smoking-tobacco. It has also been sought to utilize the stems by providing fibrous material or leaf-tobacco with adhesive substance superficially applied and dusting a powder made from the stems upon the fibrous material or leaf-tobacco, forming a coating upon the same to provide a wrapper or the like. It has also been sought to utilize the stems by crushing them between pressure-rollers and then mixing them loosely with tobacco. It has also been sought to utilize waste tobacco by coating or preparing thin sheets of fibrous material on one or both surfaces with fine particles of tobacco. It has also been sought to utilize stems by making them into leaves from pulp, darkening their color afterward by spreading upon the sheet formed finely-divided leaf substance pressed in and made to penetrate the surface, the product being a composite tobacco-wrapper. It has finally been sought to utilize the stems by softening them in water and reducing them to a pulp, then rolling the mass into sheets, with or without refuse natural leaf, (scrap,) either dry or in form of pulp, incorporated therewith by pressure, or by reducing the stems to pulp, drying the mass, mixing it with finely-divided tobacco-leaves, and pressing the whole together. In no case, however, have the stems been utilized by pulverizing them and distributing their substance finely throughout the manufactured tobacco by distributing it between layers of leaf-tobacco and compacting it into these layers by pressure, thus making of the stems and leaf a solid tobacco product in acceptable condition, with the substances well blended.

In some cases in the manufacture of tobacco, to weight the mass or for other purposes, the finished product has been made to contain various foreign substances more or less deleterious. These substances, foreign to the tobacco itself, are to be condemned as adulterants. By the addition of the stem under my procedure a substance is used which is of tobacco itself, and which can be supplied at so small a cost as effectually to displace adulterants. I first take the stems in a sufficiently dry condition and subject them to a triturating or grinding operation. I prefer to subject them to the mutual attrition incident to the operation of air-grinding in the so-called "cyclone mill." I then take the powder and sprinkle it upon the successive layers of tobacco in the operation of packing or casing it, suitably dampening to insure incorporation and homogeneousness. The dampening may be by any suitable liquor, as by the usual flavoring-liquids. I find it advantageous to employ one ounce of the ground stems to one pound of tobacco, though more or less may be used, as desired.

When the tobacco has been put up with powder made from the stems, as above described, the powder is nearly or quite evenly distributed throughout the mass, and becomes then effectually incorporated with and a part of the tobacco. Though the stem substance was in the form of powder when added to the other tobacco in the course of manufacture it may now, strictly speaking, have ceased to be a powder. The product resulting from this procedure, though distinguishable upon inspection from pure leaf-tobacco, has the general appearance of the best manufactured tobacco, is homogeneous, is of good appearance, and is in taste the same as tobacco made from leaf alone.

No claim is made in this application to the particular product resulting from the method described, since the product forms the subject-matter of another application filed of even date herewith, Serial No. 301,345.

Having thus fully described my invention, what I claim as new, and desire to secure by Letters Patent, is—

The method of utilizing the stems in the manufacture of tobacco, which consists in reducing them to a powder and incorporating them with leaf-tobacco by placing the pulverized stem substance and the leaf substance together, layer after layer of each, and compacting by pressure until a solid product or plug is made sufficiently rigid to hold together and keep its form, substantially as described.

In testimony whereof I affix my signature in presence of two witnesses.

PETER M. WILSON.

Witnesses:
R. G. DYRENFORTH,
DAVID H. MEAD.